(12) United States Patent
Izumida

(10) Patent No.: US 6,967,817 B2
(45) Date of Patent: Nov. 22, 2005

(54) RECORDING MEDIUM CARTRIDGE HAVING CARTRIDGE MEMORY WITH FRAGILE PORTION

(75) Inventor: Takahisa Izumida, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 45 days.

(21) Appl. No.: 10/647,434

(22) Filed: Aug. 26, 2003

(65) Prior Publication Data

US 2004/0107433 A1 Jun. 3, 2004

(30) Foreign Application Priority Data

Aug. 27, 2002 (JP) .............................. 2002-247301

(51) Int. Cl.⁷ ............................................. G11B 17/02

(52) U.S. Cl. ....................... 360/132; 360/133; 720/725; 720/729

(58) Field of Search ............................... 360/132, 133; 720/725, 729

(56) References Cited

U.S. PATENT DOCUMENTS

| 5,595,297 | A  | * | 1/1997  | Borck et al. ........... 206/387.13 |
| 6,633,454 | B1 | * | 10/2003 | Martin et al. ................ 360/132 |
| 6,667,846 | B2 | * | 12/2003 | Kano et al. ................. 360/96.5 |
| 6,680,817 | B1 | * | 1/2004  | Koseki et al. ............... 360/132 |
| 6,686,539 | B2 | * | 2/2004  | Farquhar et al. ........... 174/52.3 |
| 6,702,215 | B2 | * | 3/2004  | Stamm et al. .............. 242/348 |
| 6,856,486 | B2 | * | 2/2005  | Onmori et al. ............. 360/132 |
| 2002/0036237 | A1 | * | 3/2002 | Atherton et al. ............ 235/492 |
| 2002/0135481 | A1 | * | 9/2002 | Conwell et al. ......... 340/572.1 |
| 2002/0175102 | A1 | * | 11/2002 | Hatano .................... 206/387.1 |
| 2003/0095359 | A1 | * | 5/2003 | Oishi ........................ 360/133 |

FOREIGN PATENT DOCUMENTS

| JP | 2001-332064 A | 11/2001 |
| JP | 2003-067701 A | 3/2003 |

* cited by examiner

Primary Examiner—Jefferson Evans
(74) Attorney, Agent, or Firm—Sughrue Mion, PLLC

(57) ABSTRACT

A recording medium cartridge is provided with a cartridge medium and cartridge memory in a cartridge case composed by being divided into two halves, in which the cartridge memory has a fragile part partially formed therein, one side bordered on the fragile part is firmly fixed to one of the two halves, and the other side is firmly fixed to the other of the two halves.

18 Claims, 2 Drawing Sheets

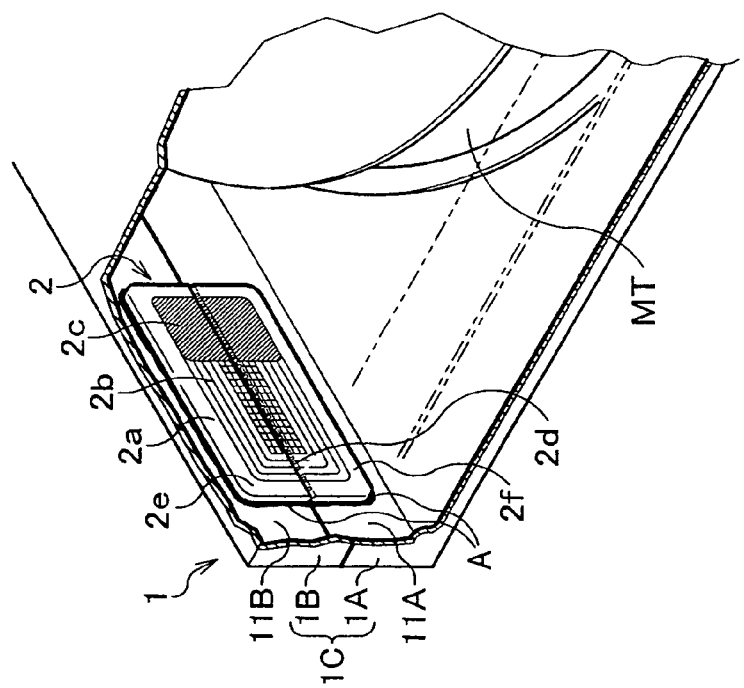
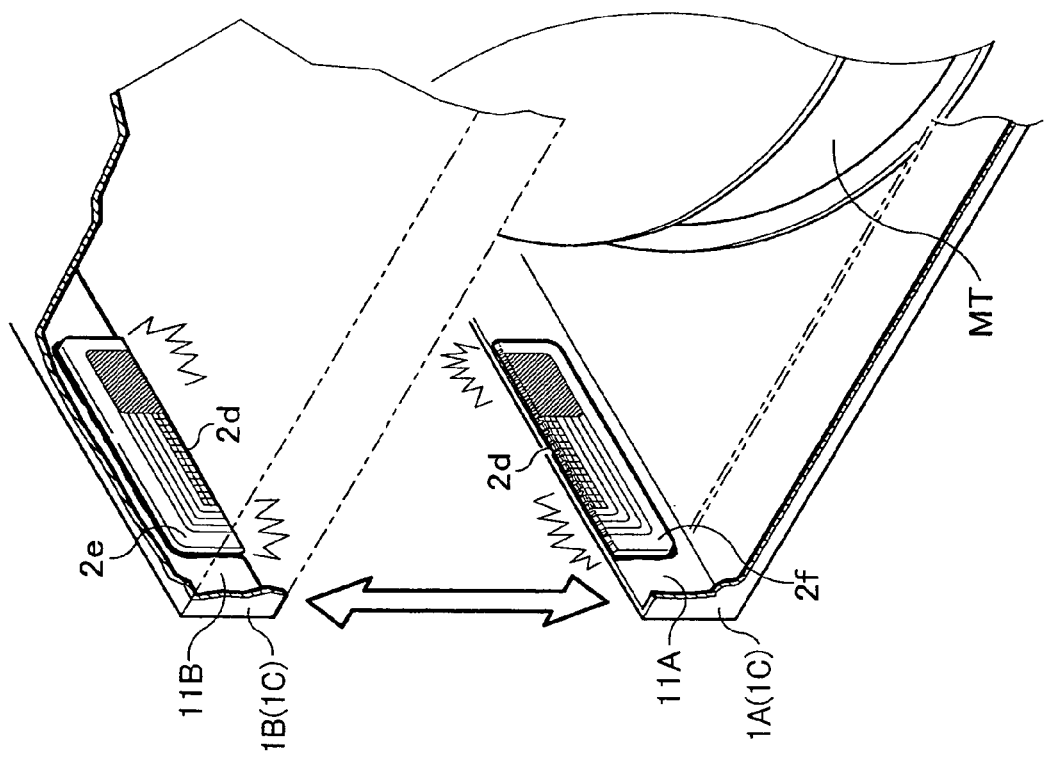

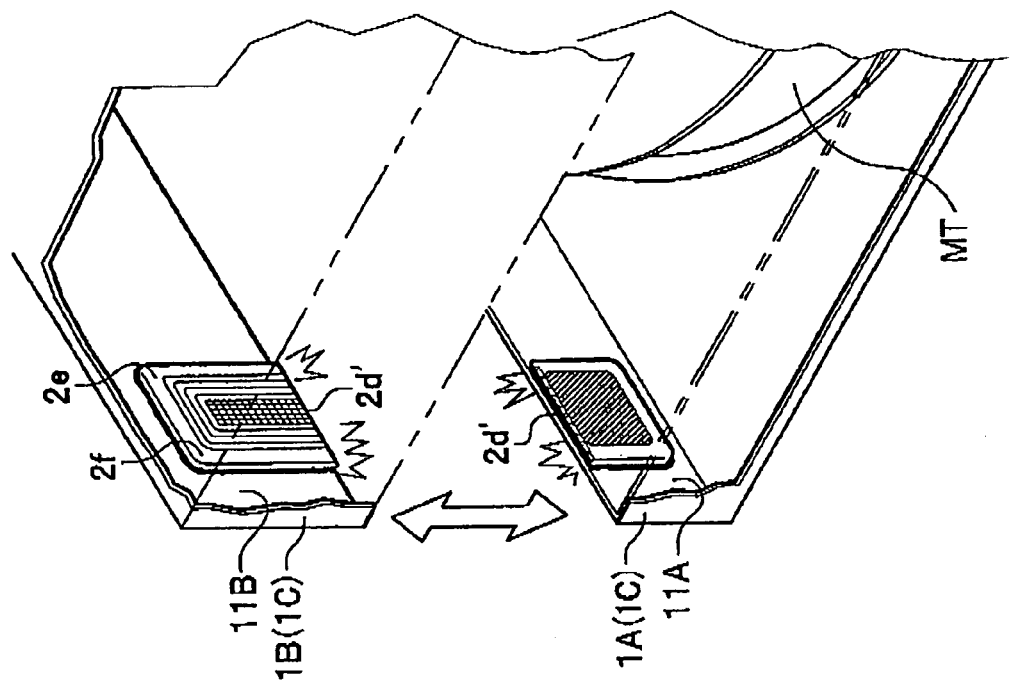
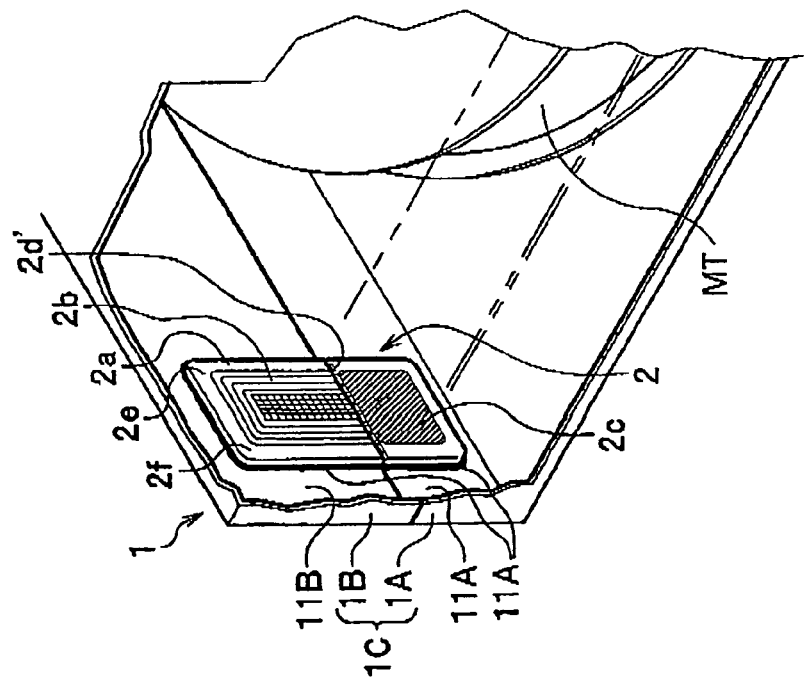

US 6,967,817 B2

RECORDING MEDIUM CARTRIDGE HAVING CARTRIDGE MEMORY WITH FRAGILE PORTION

FIELD OF THE INVENTION

The present invention relates to a recording medium cartridge with a cartridge memory (non-contact memory).

BACKGROUND OF THE INVENTION

Conventionally, a magnetic tape cartridge (recording medium cartridge) is provided with a cartridge memory to record unique information such as a serial number and a usage history of the magnetic tape cartridge other than a magnetic tape which is a recording medium. Because such the cartridge memory enables electric power and signals to be sent/received with no contact by electromagnetic induction, it is housed in a cartridge case of the magnetic tape cartridge (for example, see Japan patent laid open publication 2001-332064).

In the meantime, the conventional magnetic tape cartridge is set so that recording/reproducing and modifying data can be repeated. Therefore, it is difficult to simply verify data authentication, that is, whether or not it has been tampered with. Especially, in fields of medical care, law, and the like, the data authentication recorded in the tape cartridge is required to be assured, and it is needed to simply verify the data authentication.

In order to solve the problem, for example, a method for verifying the data authentication is contemplated, by recording information which shows data before tampering and comparing it with information produced from data which is reproduced from a magnetic tape in reproducing. However, there exists a problem in that the method results in not being able to assure data authentication if the magnetic tape and cartridge memory are changed to a magnetic tape after being tampered with and its corresponding cartridge memory.

SUMMARY OF THE INVENTION

An exemplary object of the present invention is to provide a recording medium cartridge being able to also assure data authentication for a change of a recording medium and cartridge memory intending for tampering. A recording medium cartridge of the invention to solve the problem is characterized by being provided with a cartridge memory in a cartridge case which is divided into and composed of two halves, wherein an fragile portion is partially formed and one side bordered on the fragile portion is firmly fixed to the one half side, and the other side is firmly fixed to the other half side.

According to the invention, for example, in the case that a third party tampers with the content of a magnetic tape cartridge for the purpose of tampering with the magnetic tape and changes the magnetic tape and cartridge memory, which are the content of the tape cartridge, to content of another magnetic tape cartridge, if disassembling the cartridge case trying to take out both of the magnetic tape and cartridge memory, the fragile portion of the cartridge memory is broken, thereby resulting in the information of the cartridge memory being unable to be read. Therefore, if changing the recording medium and cartridge memory for the purpose of tampering with the magnetic tape to another recording medium and cartridge memory is tried, the cartridge memory itself is broken, thereby an act of changing in itself becomes impossible. Moreover, by the cartridge memory being broken in this way, a proof of intentional tampering remains. That is, because the proof surely remains in this way, a user does not use a magnetic tape without knowing that it has been tampered with, whereby the data authentication is assured.

BRIEF DESCRIPTION OF THE DRAWINGS

FIG. 1A is an enlarged perspective view showing a main part within a magnetic tape cartridge related to the invention.

FIG. 1B is an exploded perspective view showing an exploded state of the magnetic tape cartridge of FIG. 1A.

FIG. 2A is an enlarged perspective view showing a main part within a magnetic tape cartridge related to the invention.

FIG. 2B is an exploded perspective view showing an exploded state of the magnetic tape cartridge of FIG. 2A.

PREFERRED EMBODIMENT OF THE INVENTION

Hereinafter, a recording medium cartridge of the present invention will be described in detail with reference to the drawings. Meanwhile, in the embodiment, a magnetic tape cartridge will be described as an example of the recording medium cartridge.

As shown in FIGS. 1A and 1B, an appearance of a magnetic tape cartridge (recording medium cartridge) 1 is composed of a cartridge case 1C divided into a lower half 1A and upper half 1B. A magnetic tape (recording medium) MT and cartridge memory 2 for recording data are mainly provided inside the cartridge case 1C.

The cartridge memory 2 is a rectangular sheet form electronic component as a whole, of which main body is an IC chip (not shown in the drawings) sealed in a globe top 2c which is a sealant composed of resin, and the IC chip is wired on a loop antenna 2b printed on a board 2a. A cut-off line portion 2d (fragile portion) along a longitudinal direction is formed at approximately the center in a lateral direction, and one side portion 2e bordered on the cut-off line portion 2d is firmly fixed to a side wall 11B of the upper half 1B with an adhesive A, while the other side portion 2f is firmly fixed to a side wall 11A of the lower half 1A with the adhesive A. Meanwhile, the cut-off line portion 2d is formed in such a way that fine holes are arrayed like a perforation from one end of the cartridge memory 2 to the other end so that the memory 2 is separated into two.

Then, in a case where a third party tampers with the content of the magnetic tape cartridge 1 for the purpose of tampering with the magnetic tape and changes its content, the magnetic tape and cartridge memory 2, to a content of the magnetic tape cartridge 1 intended to be tampered with are described. Firstly, in the case that the third party tries to take out the content from the magnetic tape cartridge 1 which he/she has tampered with, if the cartridge case 1C is disassembled as shown in FIG. 1B, the cartridge memory 2 is broken at the cut-off line portion 2d, thereby being separated into two portions. On the other hand, in the case that the third party tries to take out the content from the magnetic tape cartridge 1 which he/she tries to tamper with, if the cartridge case 1C is disassembled, the cartridge memory 2 is broken from the cut-off line portion 2d same as above, thereby being separated into two.

According to the above, the following effects can be obtained in the embodiment.

If the cartridge memory 2 and the cartridge case 1C are disassembled intending to take out the magnetic tape MT, the cut-off line portion 2d of the cartridge memory 2 is broken, whereby information from the cartridge memory 2 becomes unreadable. So, if an attempt is made to try and change the magnetic tape MT and cartridge memory 2 for the purpose of tampering with them, an act of changing in itself becomes impossible. A proof of someone trying to tamper with the cartridge case remains by virtue of the cartridge memory 2 being broken. That is, with the proof surely remaining in this way, a user does not use a magnetic tape without knowing that it has been tampered with, whereby the data authentication is assured.

As described above, the invention is not limited to the above embodiment and various embodiments are available.

In the embodiment, although the cut-off line portion 2d along the longitudinal direction is formed at the approximately center 2d (fragile portion) along the lateral direction, the invention is not limited to this. The fragile portion may be formed anywhere if it is at a position at which the cartridge memory 2 can be separated and broken. For example, as shown in FIGS. 2A and 2B, by making the fragile portion formed along the lateral direction at approximately the center (2d') in the longitudinal direction of the board 2a, composing the cartridge memory 2 so as to be separated into the globe top 2c and loop antenna 2b is available.

In the embodiment, the magnetic tape MT is adopted as a recording medium. However, the invention is not limited to this and any recording medium such as a magnetic disk, optical recording tape and optical recording disk is available.

In the embodiment, although the cartridge memory 2 is firmly fixed to each side wall 11A and 11B of the cartridge case 1C with the adhesive A, the invention is not limited to this and, for example, the cartridge memory 2 may be firmly fixed to each bottom wall of the cartridge case 1C, or may be firmly fixed to each side wall 11A and 11B by caulking and the like.

In the embodiment, although the cut-off line portion 2d making fine holes arrayed as a perforation is adopted as a fragile portion, the invention is not limited to this and anything is available if it is composed so that the cartridge memory 2 may be easily broken to be separated into two or more parts when the cartridge case 1C is disassembled. For example, with the board 2a being partially made of material with low strength which is easy to break, the portion may be made as the fragile portion.

What is claimed is:

1. A recording medium cartridge comprising a cartridge medium and cartridge memory in a cartridge case composed by being divided into two halves,
    wherein said cartridge memory has a fragile portion partially formed therein, one side bordered on the fragile portion is fixed to one of said two halves, and the other side is fixed to the other of said two halves.

2. A recording medium cartridge according to claim 1, wherein said fragile portion is a cut-off line composed by fine holes being arrayed.

3. A recording medium cartridge according to claim 2, wherein said fragile portion is formed at an approximately center of a lateral direction of said cartridge memory along a longitudinal direction.

4. A recording medium cartridge according to claim 2, wherein said fragile portion is formed at an approximately center of a longitudinal direction of said cartridge memory along a lateral direction.

5. A recording medium cartridge according to claim 2, wherein said recording medium is a magnetic tape.

6. A recording medium cartridge according to claim 2, wherein said recording medium is an optical recording disk.

7. A recording medium cartridge according to claim 1, wherein said fragile portion is composed of material with lower strength for other portions.

8. A recording medium cartridge according to claim 7, wherein said fragile portion is formed at an approximately center of a lateral direction of said cartridge memory along a longitudinal direction.

9. A recording medium cartridge according to claim 7, wherein said fragile portion is formed at an approximately center of a longitudinal direction of said cartridge memory along a lateral direction.

10. A recording medium cartridge according to claim 7, wherein said recording medium is a magnetic tape.

11. A recording medium cartridge according to claim 1, wherein said fragile portion is formed at an approximately center of lateral direction of said cartridge memory along a longitudinal direction.

12. A recording medium cartridge according to claim 1, wherein said fragile portion is formed at an approximately center of a longitudinal direction of said cartridge memory along a lateral direction.

13. A recording medium cartridge having an IC chip and antenna according to claim 1, wherein said fragile portion cuts across both the IC chip and antenna.

14. A recording medium cartridge according to claim 1, wherein said cartridge memory communicates data with no contact.

15. A recording medium cartridge according to claim 1, wherein said cartridge memory is fixed to each half with an adhesive.

16. A recording medium cartridge according to claim 1, wherein said cartridge memory is fixed to each half by caulking.

17. A recording medium cartridge according to claim 1, wherein said recording medium is a magnetic tape.

18. A recording medium cartridge according to claim 1, wherein said recording medium is an optical recording disk.

* * * * *